Oct. 6, 1964    D. E. HILL    3,151,638
APPARATUS AND METHOD FOR WINDING AND INSERTING COILS
Filed Dec. 19, 1960    12 Sheets-Sheet 1

INVENTOR:
DONALD E. HILL
BY Sutherland, Poster & Taylor
ATTORNEYS.

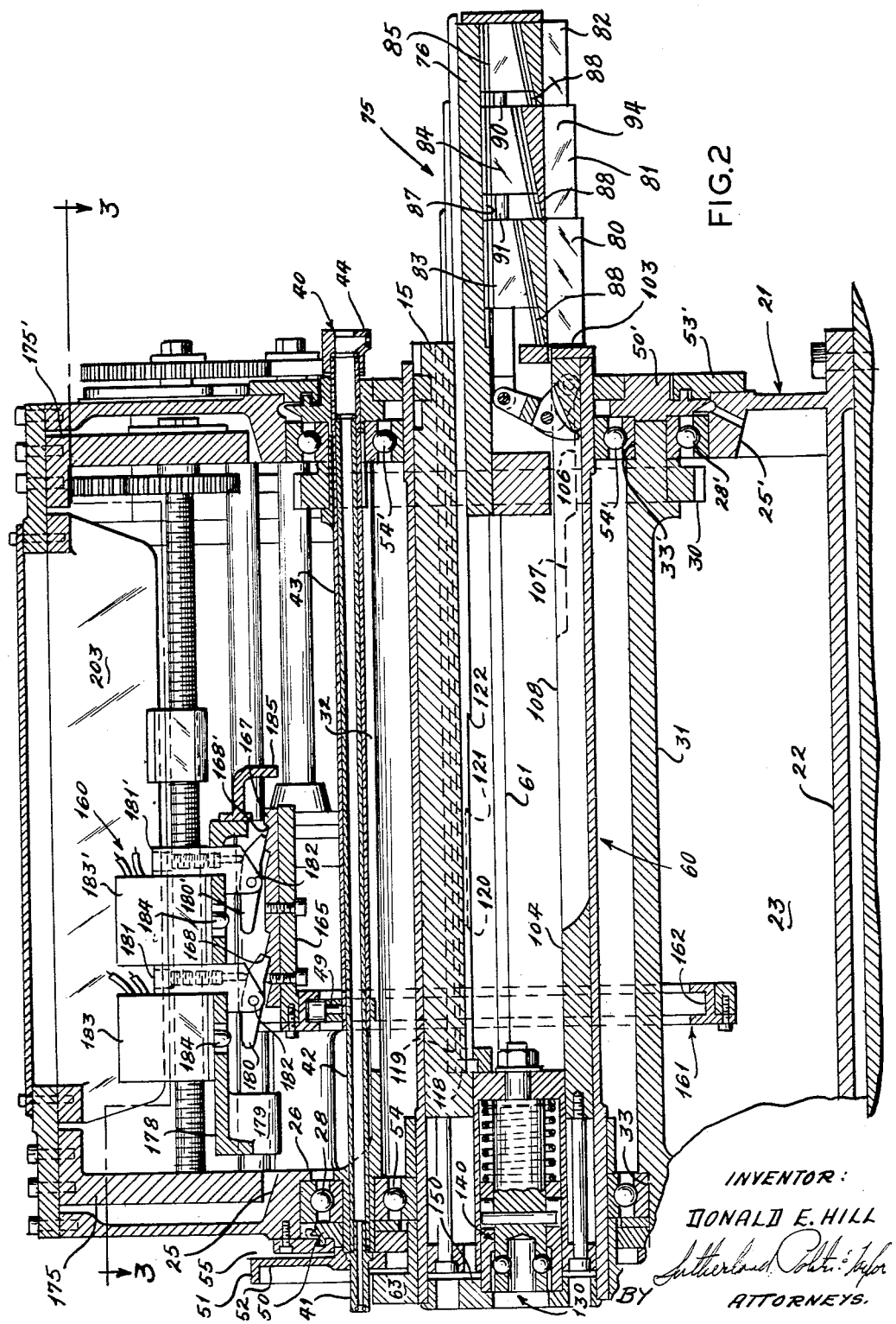

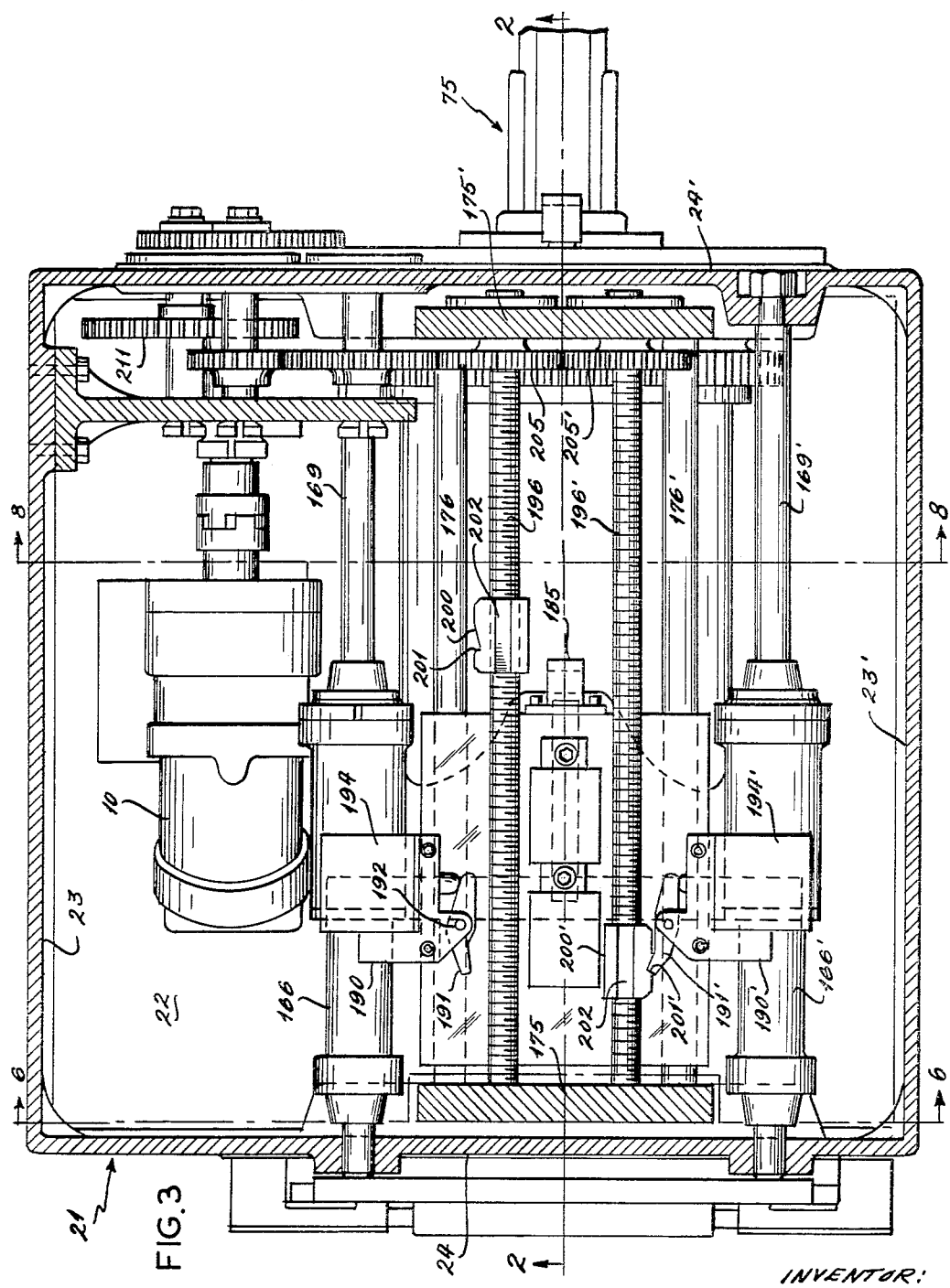

Oct. 6, 1964 D. E. HILL 3,151,638
APPARATUS AND METHOD FOR WINDING AND INSERTING COILS
Filed Dec. 19, 1960 12 Sheets-Sheet 4
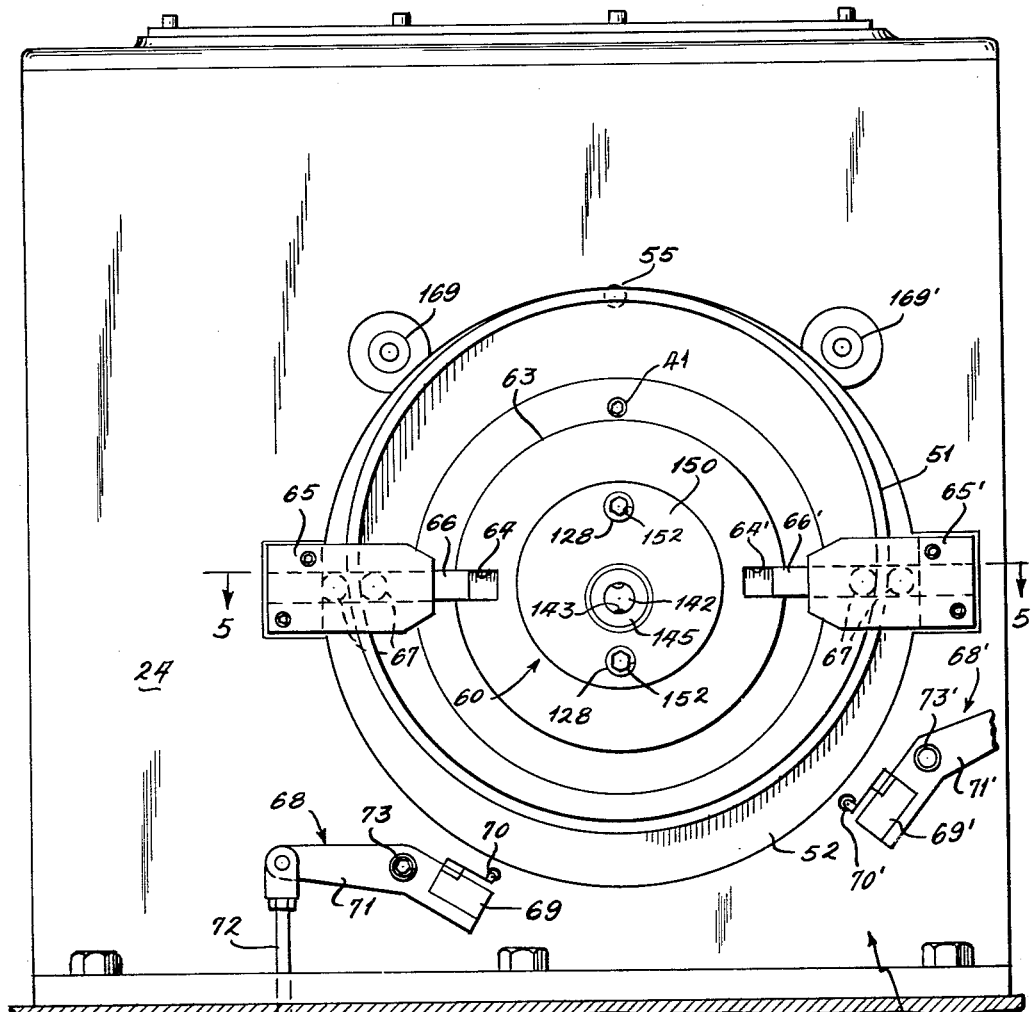
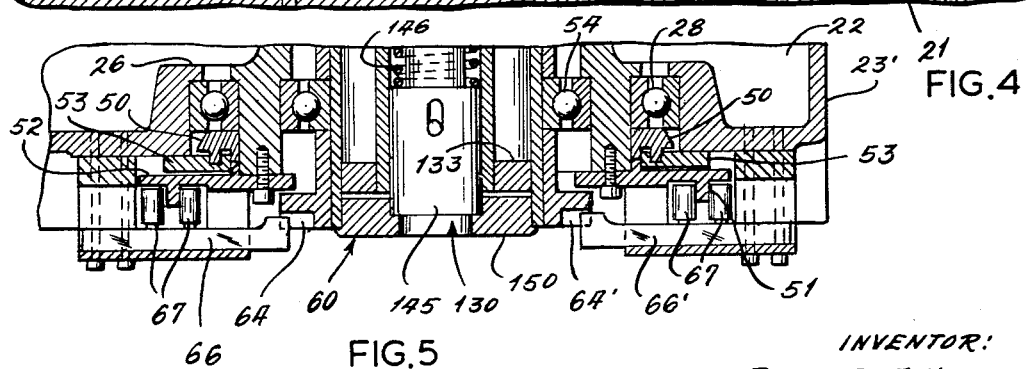
FIG.5
INVENTOR:
DONALD E. HILL
BY Sutherland, Potter & Taylor
ATTORNEYS.

Oct. 6, 1964     D. E. HILL     3,151,638
APPARATUS AND METHOD FOR WINDING AND INSERTING COILS
Filed Dec. 19, 1960     12 Sheets-Sheet 5

INVENTOR:
DONALD E. HILL
BY *Sutherland, Roberts & Taylor*
ATTORNEYS.

Oct. 6, 1964        D. E. HILL        3,151,638
APPARATUS AND METHOD FOR WINDING AND INSERTING COILS
Filed Dec. 19, 1960        12 Sheets-Sheet 6

INVENTOR:
DONALD E. HILL
BY
ATTORNEYS.

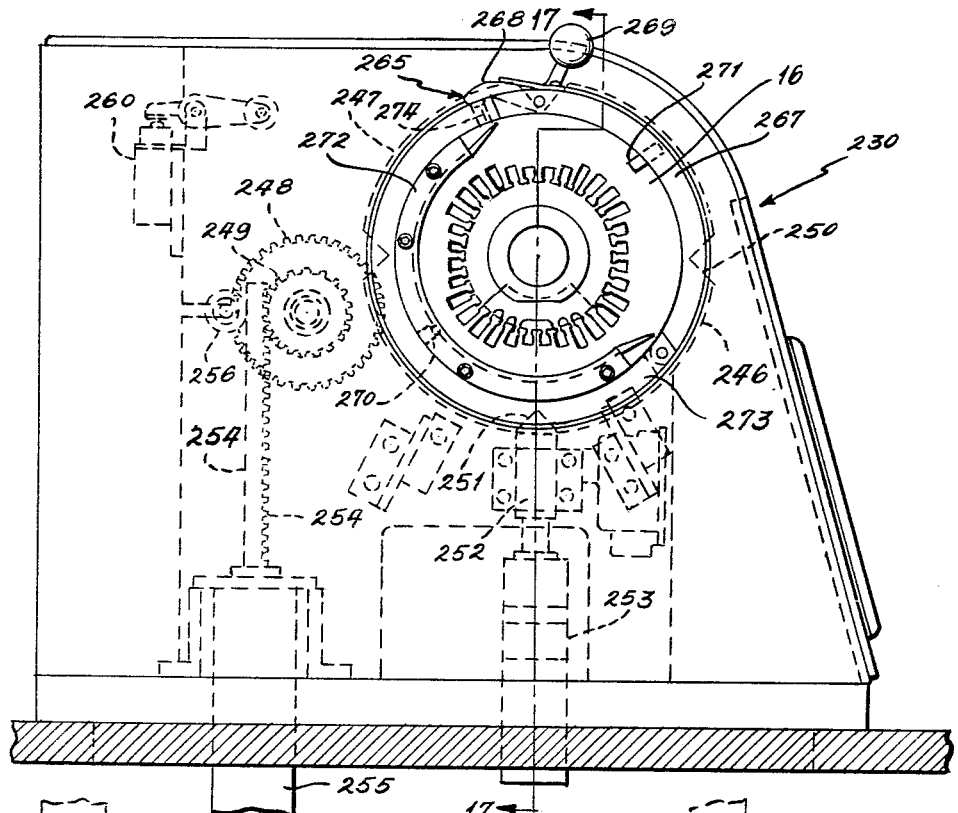
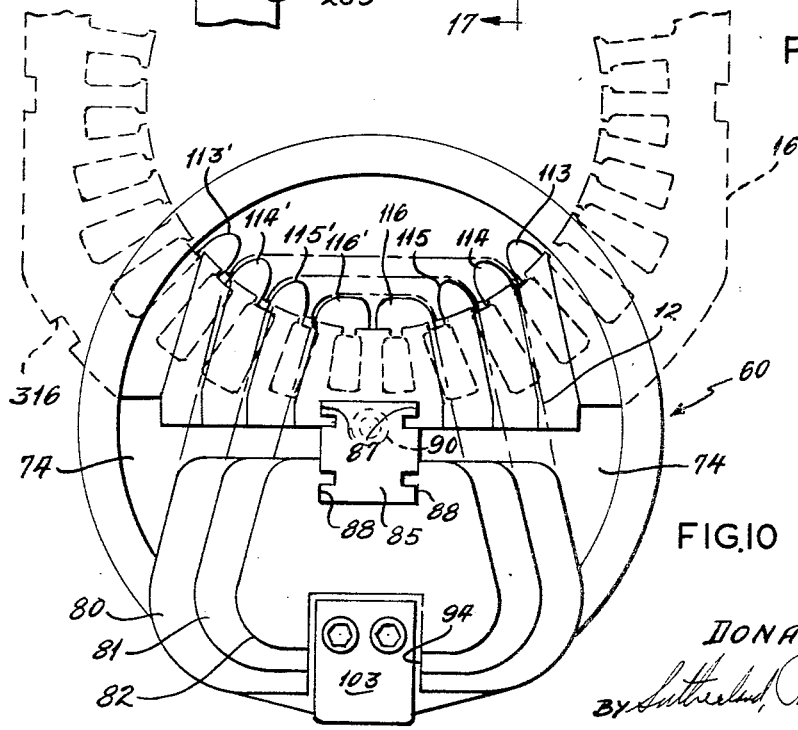

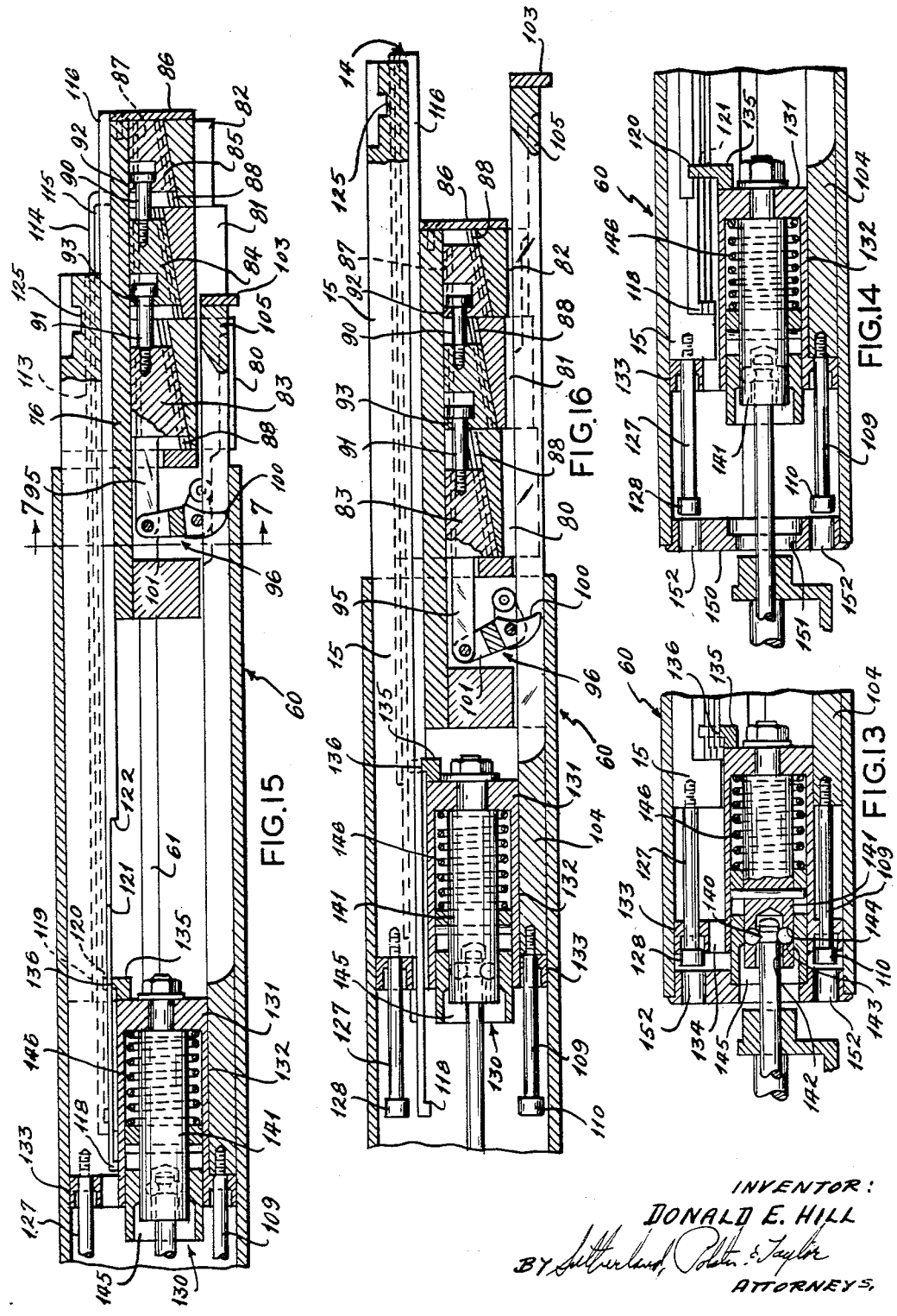

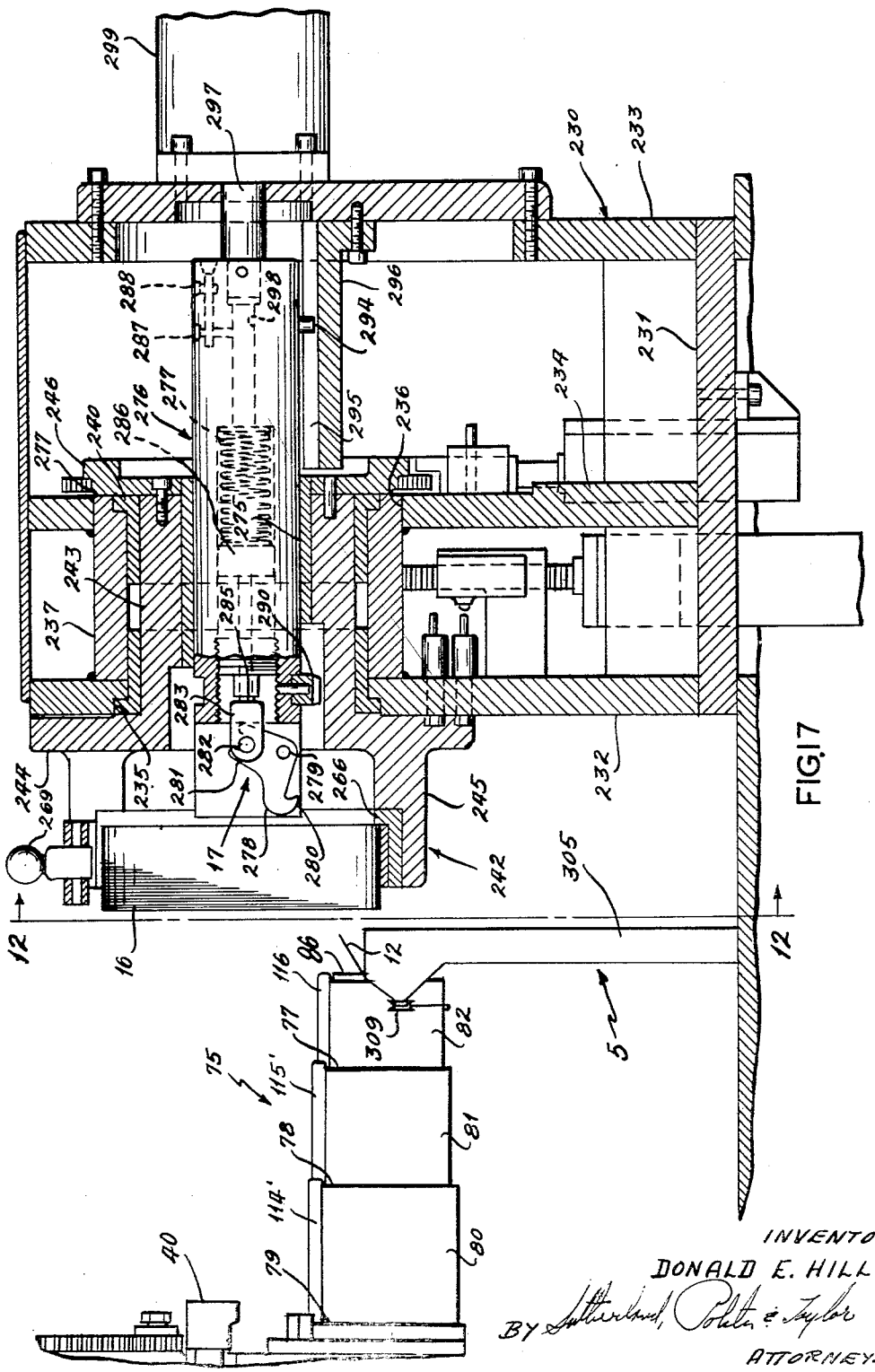

Oct. 6, 1964   D. E. HILL   3,151,638
APPARATUS AND METHOD FOR WINDING AND INSERTING COILS
Filed Dec. 19, 1960   12 Sheets-Sheet 11

INVENTOR:
DONALD E. HILL
BY
ATTORNEYS.

United States Patent Office 3,151,638
Patented Oct. 6, 1964

3,151,638
APPARATUS AND METHOD FOR WINDING AND INSERTING COILS
Donald E. Hill, Bridgeton, Mo., assignor to Emerson Electric Co., a corporation of Missouri
Filed Dec. 19, 1960, Ser. No. 76,652
14 Claims. (Cl. 140—92.1)

This invention relates to the winding of coils for insertion into the slots of a stator of an electric motor.

The problem of placing coils in the narrow slots of the stator of an electric motor has occupied those skilled in the art of electric motor manufacture for many years. Commonly, the coils are either machine wound in the stator slot by wire guns which simply lay down the coils one turn at a time, describing the path of the coil down the length of one slot and back the length of the slot in which the return reach of the coil is to be put, or they are preformed and placed manually by inserting the pre-formed coils radially and chordally into the slots. Kayser, No. 1,798,980, illustrates the first type of mechanical winding machine. Mason, No. 2,836,204 illustrates a machine by which the insertion of pre-formed coils is accomplished. In Mason, the pre-formed coils are transfered to a head, from which the coils are pushed chordally into the slots of the stator.

Mason, No. 2,934,099, illustrates a third approach to the coil insertion problem. In Mason (099), preformed coils are inserted axially into slots in a stator, by means of pusher plates, sandwiched, as are the coils, between divider plates, which act as guides. This Mason machine is said in the patent to be particularly adapted to use with a two-pole motor. When used with a four-pole motor, it has certain disadvantages. For example, after each set of coils is wound, the conductor is broken, so that the leads from each set of coils must be reconnected after the coils are inserted, and the free end of the conductor must be anchored to the coil form, manually, as each new set of coils is begun.

One of the objects of this invention is to provide a method and apparatus for winding coils and inserting them axially into the slots in a stator, whereby the conductor from which the various coils are made may be kept continuous, regardless of the number of poles, hence sets of coils, in a winding of the stator.

Another object of this invention is to provide such method and apparatus by which stators can be wound quickly and effectively as compared with methods and machines known heretofore.

Other objects will become apparent to those skilled in the art in the light of the following description and accompanying drawing.

In accordance with this invention, generally stated, a set of coils for one pole of a stator is wound in one direction of rotation about a coil form, and inserted axially into slots of a stator; then, while the integrity of the conductor is maintained, another set of coils, for a different pole, is wound in the opposite direction of rotation about the coil form, and this set of coils, oriented axially in the same direction as the first set of coils, is inserted axially into slots of the stator. For stators to be wound for more than two poles, the process is repeated, successive sets of coils being wound in opposite directions of rotation, until all the poles have been wound, after which the conductor may be broken. It can be appreciated that if it were desired to do so, the conductor can be broken betwen each set of coils during the process, or between any two successive sets of coils, but the method and apparatus of this invention permit the winding of successive sets of coils with an unbroken conductor.

The machine upon which these coils are wound and by which they are inserted includes fingers which extend along and are movable longitudinally to project beyond an end of the coil form, a wire gun mounted to rotate about the fingers and coil form while traveling longitudinally of the fingers and coil form, a stripper, in cooperative engagement with the fingers, a guide tool for supporting and guiding the fingers when they are in their extended position, a latch mechanism for pulling the stripper through a stator to be wound, and a crossover wire holding mechanism for metering the crossover wire and holding it between coils of successive poles.

Mechanism is also provided for jumping the wire gun, so that while the gun moves longitudinally uniformly along certain sections of the coil form, it jumps quickly from one section to the next.

The machine (upon which these coils are wound, and by which they are inserted) preferably includes a head section in which a barrel is rotatably mounted, the wire gun being mounted on the barrel for rotation therewith, and a floating core being mounted axially within the barrel. The floating core is preferably held against rotation with the barrel by devices which alternately engage with and disengage from the core, to permit the passage of the conductor, either in or out of the gun, around the core. The coil form is connected with the core at one end, and the wire gun rotates about the coil form.

In the preferred embodiment, the wire gun is slidably mounted upon the barrel, and the means for moving the wire gun axially as it rotates are also housed within the head section. The core also contains the fingers and stripping means, and an actuator bar and push plate, for guiding and stripping the coils from the coil form into the slots of the stator.

Preferably, the machine includes a push rod section and a stator section, both of which are physically separated from the head section during a part of the winding and inserting cycle, and both of which are physically connected with the head section during another part of the cycle. A wire feeding mechanism is positioned to feed wire between the push rod section and the head section. A cross over wire holding mechanism is positioned between the head section and the stator section.

In the drawing, FIGURE 1 is a view in side elevation, partly broken away, of a machine constructed in accordance with one illustrative embodiment of this invention;

FIGURE 2 is a sectional view, partly broken away, taken along the line 2—2 of FIGURE 3, of the head section of the machine shown in FIGURE 1;

FIGURE 3 is a sectional view taken along the line 3—3 of FIGURE 2;

FIGURE 4 is a view in end elevation of the head section, as viewed from the push rod section;

FIGURE 5 is a sectional view taken along the line 5—5 of FIGURE 4;

FIGURE 10 is a somewhat diagrammatic view showing the relation between the coil form end of the core of the head section, which is shown in end elevation, and the stator to be wound, shown in dotted lines, the coils on the coil form, to be inserted in the stator, indicated by broken lines;

FIGURE 12 is a view in end elevation of the stator section viewed along the line 12—12 of FIGURE 17;

FIGURE 13 is a fragmentary sectional view through the push rod section end of the core, showing the push rod in its initial seated and locked position within the drive coupling piston;

FIGURE 14 is a fragmentary sectional view similar to that of FIGURE 13, showing the drive coupling advanced to the position at which it engages the stripper and core collapse actuator;

FIGURE 15 is a fragmentary sectional view through the coil form end of the core, showing the fingers, stripper, and push plate in intermediate position, and the inner coil form block in partly collapsed condition;

FIGURE 16 is a fragmentary section view corresponding with the sectional view shown in FIGURE 15, showing the fingers, push plate and push rod in their most extended position, and all of the coil form blocks collapsed;

FIGURE 17 is made up of a fragmentary sectional view of the stator section, taken along the line 17—17 of FIGURE 12, and a view in side elevation of the coil form and crossover wire holding mechanism, showing the relationship of these elements to one another;

Figure 1:
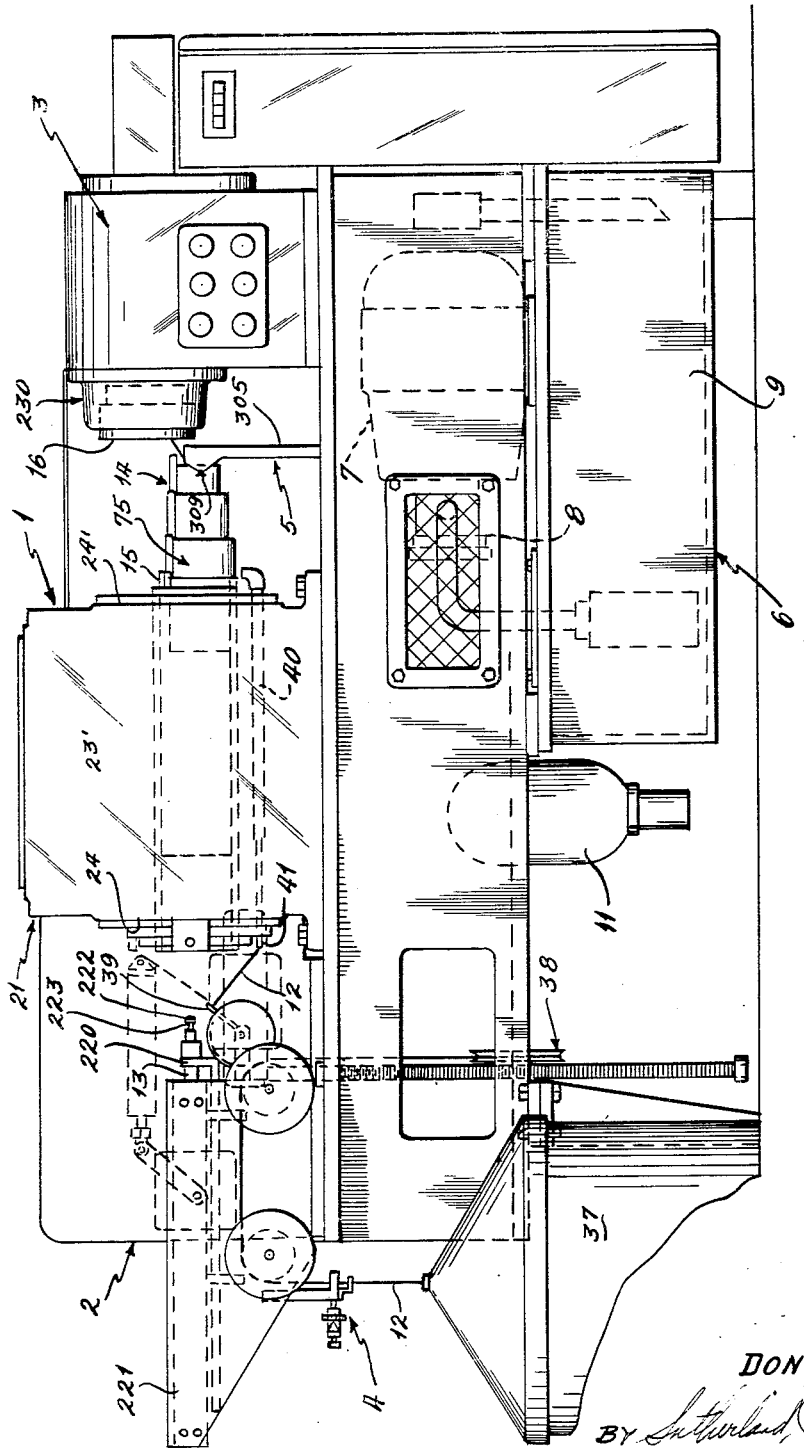
Figure 6:
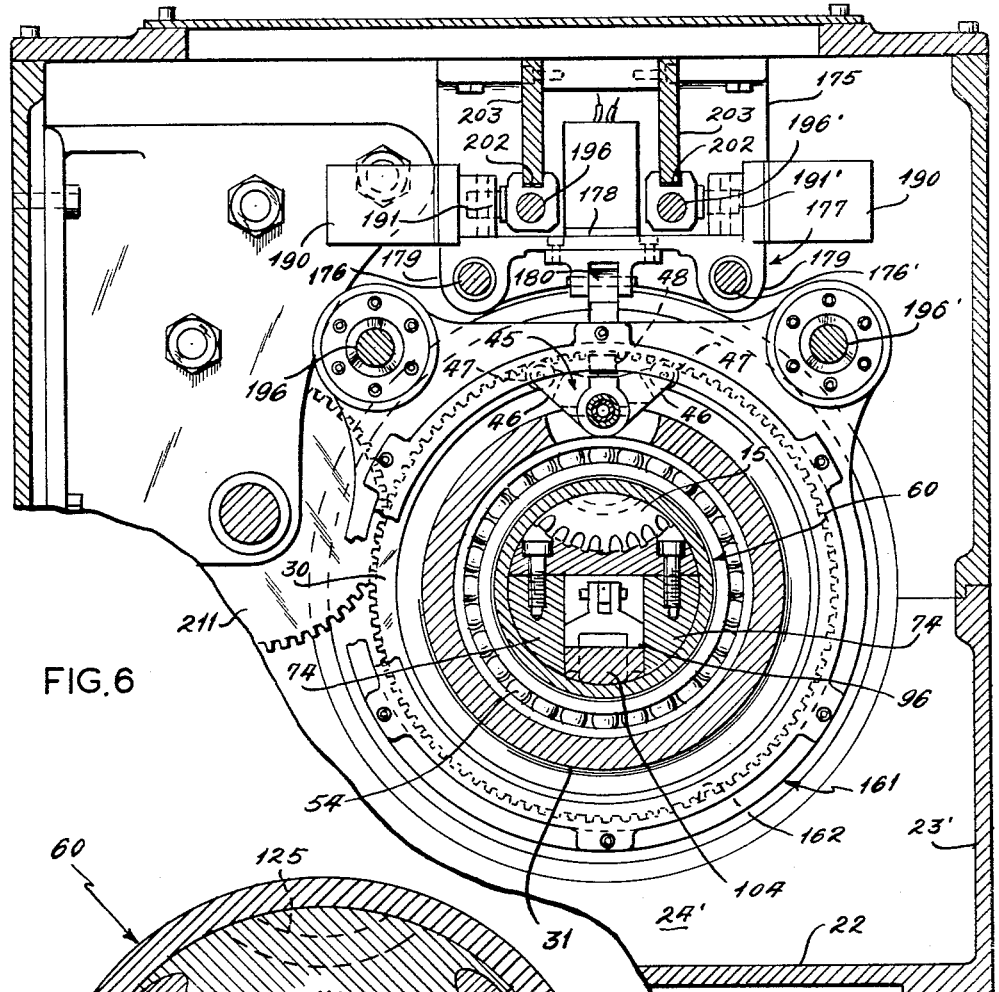
FIGURE 6 is a sectional view taken along the line 6—6 of FIGURE 3.
Figure 7:
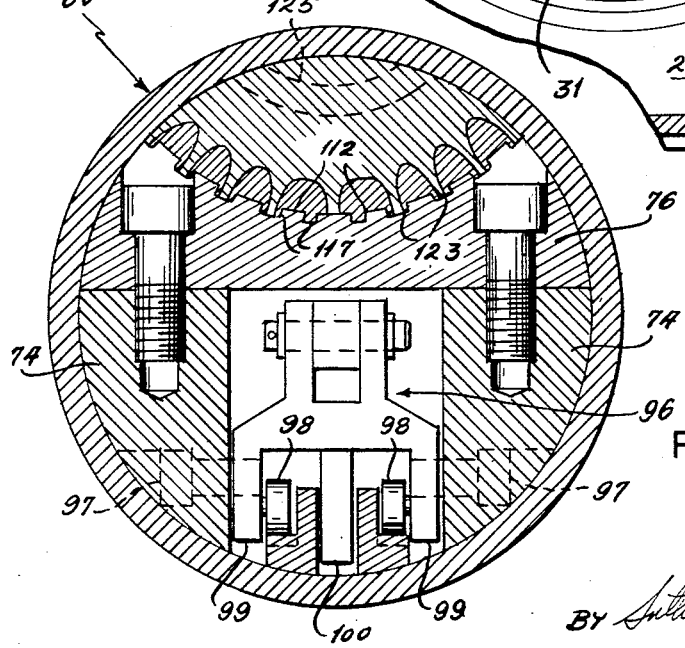
FIGURE 7 is a sectional view taken along the line 7—7 of FIGURE 15.

Referring now to the drawing for one illustrative embodiment of machine of this invention, there are five main assemblies or sections: a head section 1, a tool actuator or push rod section 2, a stator section 3, a wire feed assembly 4, and a crossover wire holding mechanism 5.

The three sections are mounted on and supported by a stand 6, which, in the embodiment shown, also carries an electric motor 7, a hydraulic pump 8 with its reservoir 9, a hydraulic motor 10 (FIGURE 3) and an accumulator 11. The push rod section 2, head section 1, and stator section 3, are aligned laterally on the top of the stand 6.

In the broad aspects of the operation of the machine of this invention, a conductor 12, from the wire feed mechanism 4, is wound around a coil form 75 by means of a rotating wire gun 40, the wire gun and coil forms being elements of the head section. The push rod section is physically separated from the head section during this part of the operation. Thereafter, a push rod 13, from the push rod section 2, is actuated to move guide fingers 14 and a stripper 15 over the coil form 75, toward the stator section 3. The guide fingers 14 are moved by the push rod 13 into the bore of a stator 16 clamped in the stator section. The stripper 15 stops short of the stator. Thereupon, a latch mechanism 17, in the stator section, is moved axially to engage the stripper, and is retracted to draw the stripper through the stator, pulling the coils, with the stripper, through the slots of the stator.

The stripper and guide fingers are then retracted. The crossover wire holding mechanism 5 acts to hold the wire while the first coil of the next coil set is being wound, in the opposite direction of rotation, by the wire gun. The stator is indexed to the proper position for insertion for the next set of coils, and the process is repeated.

The various sections and mechanisms will now be described in detail.

Figure 8:
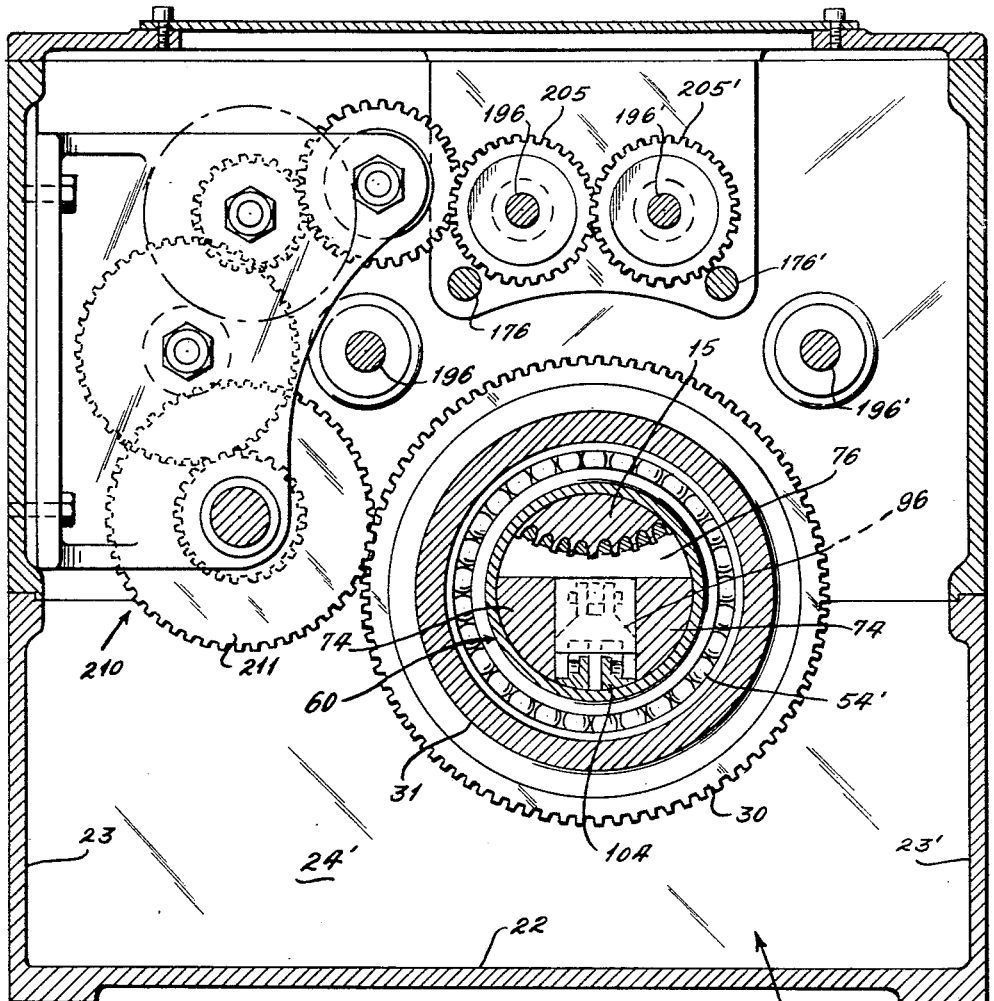
FIGURE 8 is a sectional view taken along the line 8—8 of FIGURE 3.

The head section 1, shown in detail in FIGURES 2 and 3, is the center of the machine. The head section 1 includes a housing 21, with a base wall 22, sidewalls 23 and 23', and end walls 24 and 24'. The end walls 24 and 24' have large, aligned openings in them, defined by inwardly extending annular shoulders 25 and 25' respectively. The annular shoulder 25 on the end wall 24, adjacent the push rod section 3, has an inwardly projecting flange 26 along its inside edge. The shoulder 25' on the other wall 24' does not have such a flange. In the embodiment shown, the housing 21 is split so that there are, in reality, lower and upper sections of the walls 23 and 23' and 24 and 24', as shown particularly in FIGURE 8, but this is simply a matter of convenience in assembly.

Anti-friction bearings 28 and 28' (in the embodiment shown, roller bearings), are pressed into the openings defined by the shoulders 25 and 25' respectively, rotatably to support a barrel 31. The barrel 31 is a rigid, hollow cylinder, with a slot 32 running axially of the barrel, intermediate its ends.

Mounted on the barrel, parallel with and immediately along the slot 32, is the wire gun 40. The wire gun 40, in this embodiment, is made up of four parts, a tail piece 41, a fixed tube 42, a sliding tube 43, and a nose 44. The sliding tube 43 is slidably journaled in a boss in an oil slinger plate 50' mounted on and against the radial face of the stator stand end of the barrel 31. The nose 44, secured to the outer end of the sliding tube 43, has an opening directed radially inwardly, at right angles to the axis of the tube 43, and is positioned wholly outside of the oil slinger plate 50'. One end of the fixed tube 42 extends within the sliding tube 43; the other end of the fixed tube 42 is fixed within a hole in a heavy shoulder on the barrel 31, and an aligned hole in an oil slinger plate 50 mounted on and around the push rod stand end of the barrel 31. The tail piece 41 has a part which extends within the fixed tube 42, an annular shoulder, one radial face of which abuts the end of the tube 42 and the other face of which abuts an annular shoulder within a cam track plate 52, and a part which projects well beyond the cam track plate, toward the push rod stand.

The cam track plate 52 is mounted on and against the radial face of the push rod section end of the barrel 31. Grooved trap rings 53 and 53' are mounted on the outside faces of the end walls 24 and 24' of the housing 21, around the openings. The trap rings 53 and 53' are grooved to receive an outwardly directed annular flange on the oil slinger plates 50 and 50', and serve not only as a seal but to prevent axial shifting of the rotating drum. The trap ring 53 on the end wall 24 extends between the oil slinger plate 50 and the cam track plate 52.

Inner anti-friction bearings 54 and 54', which, like the bearings 28 and 28', are roller bearings, are mounted within open-ended channels 33 on the inside ends of the barrel 31. A floating core 60 is journaled within the anti-friction bearings 54 and 54'. The floating core 60 carries the coil form 75 at its stator section end.

In this embodiment, the coil form 75 includes a fixed supporting bar 76, with a transversely concave outer surface, and three collapsible coil form blocks 80, 81 and 82, connected with the supporting bar 76 by means of wedge shaped block holders 83, 84 and 85 respectively.

Figure 11:
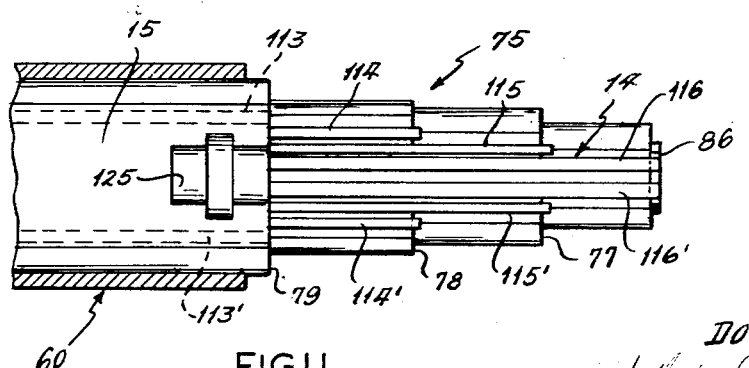
FIGURE 11 is a fragmentary top plan view of the coil form part of the head section the core housing being in section, showing the fingers and stripper in their retracted position.
Figure 9:
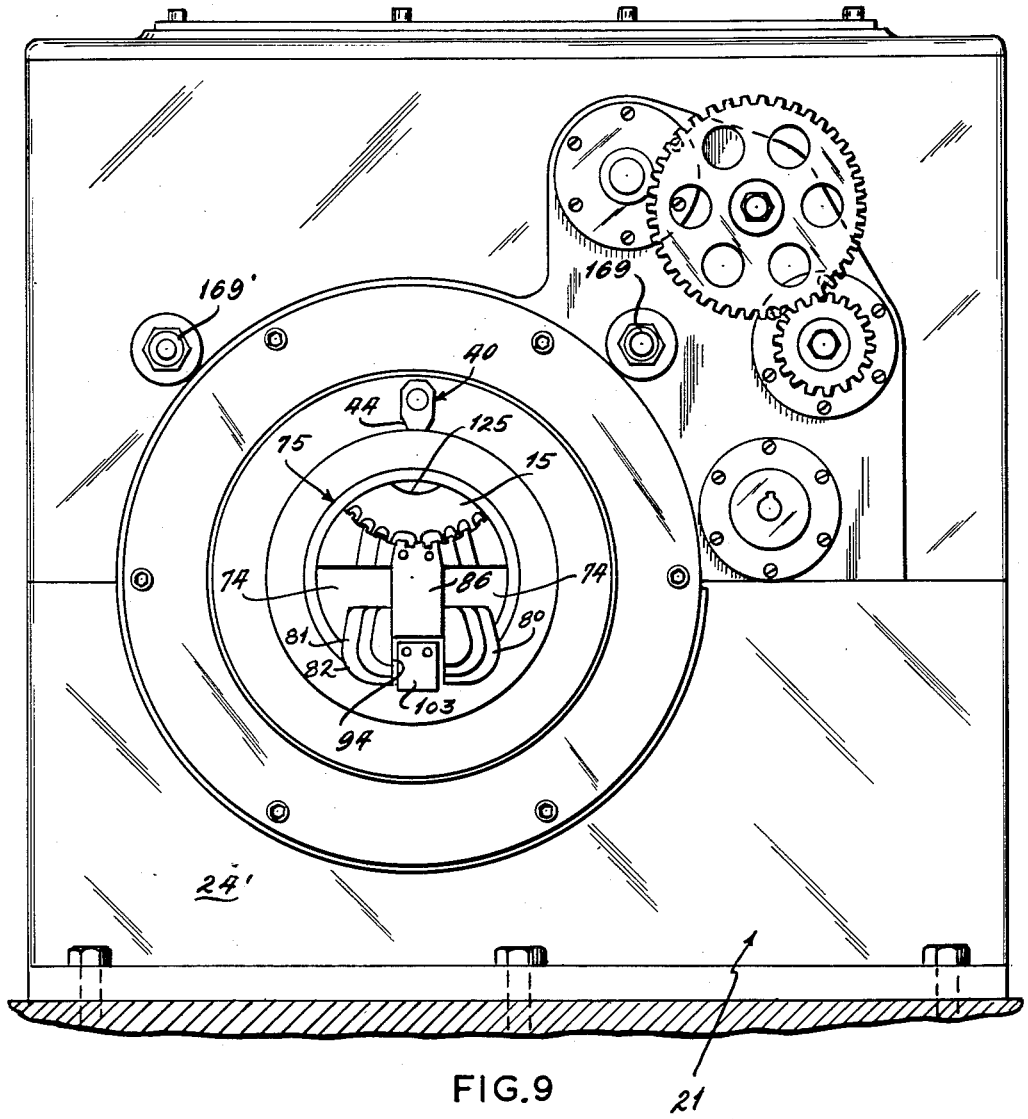
FIGURE 9 is a view in end elevation of the head section as viewed from the stator section.

The outermost block 82 is the smallest of the blocks and the supporting bar 76 is correspondingly narrow through the length of the block 82, the total girth of the form through the length of the block 82 corresponding with the smallest of three coils to be wound, as shown in FIGURE 11.

The intermediate block 81 is larger than the block 82, and the supporting bar 76 is correspondingly wider through the length of the block 81, than it is through the length of the block 82, forming an outer offset 77. The innermost block 80 is the largest of the blocks and the supporting bar 76 is correspondingly wider through the length of the block 80 than it is through the length of the block 81, forming an intermediate offset 78 between the two blocks.

Within the floating core 60, the supporting bar 76 is wider than it is along the block 80, forming an inner offset 79.

The block holders 83, 84, and 85 are slidably keyed in a keyway 87 running longitudinally of the supporting bar 76, and are also keyed into keyways 88 in an inclined face of the respective collapsible coil form blocks. The outermost block holder 85 has a lost motion connection with the intermediate block holder 84 by means of a linking stud 90 the head of which is slidably caged in a cavity defined in part by a yoke-wall 92 in the block holder 85, as shown particularly in FIGURE 15. The intermediate block holder 84 is connected with the innermost block holder 83 by means of a similar stud 91 the head of which is slidably caged in a cavity defined in part by a yoke-wall 93 in the block holder 84. The innermost block holder 83 is connected, by means of a link 95, to a bell crank lever 96 pivotally mounted in the core 60. At the outer end of the coil form 75, the coil form blocks are held against outward axial movement by a block retainer plate 86.

The coil form blocks 80, 81 and 82 are channeled, exteriorly, longitudinally to form, when the blocks are in their uncollapsed condition, as shown in FIGURE 2, a continuous channel 94, in which a wire push plate 103 travels. The wire push plate 103 is mounted on the end of a bell crank lever actuator 104. The actuator 104 is a longitudinally slotted bar, closed at both ends, and notched out at its outer sides, from the push plate end, in a series of steps 106, 107 and 108, the risers between the steps being sloped to provide a bearing surface for cam follower rollers 98, mounted on one end of the bell crank lever 96. The bell crank lever 96 has, projecting from it, a restoring lug 100 positioned to be engaged by a stop 105 which defines the end of the slot in the bell crank lever actuator.

The bell crank lever 96, in the embodiment shown, is in the form of a double yoke, pivoted on lever pins 97 mounted in bearing blocks 74 secured in the core 60. The rollers 98 are rotatably mounted on legs 99 of the lever 96 which straddle the notched-out sides of the bell crank lever actuator. The restoring lug 100, which projects from the bell crank lever on the other side of the pivotal lever pins 97 from the rollers 98, extends within the slot in the actuator 104.

The link 95, from the innermost block holder 83, is pivoted between two knuckle arms 101, also on the opposite side of the lever pins 97 from the rollers 98.

At the other end of the bell crank lever actuator 104 from the push plate 103, a smooth-shanked stud 109, with a head 110, is mounted to project longitudinally from the actuator 104.

The bell crank lever is connected by the link 95 to move the block holder 83 (and successively block holders 84 and 85) longitudinally, the block holders being restrained from transverse movement by the channel 87 in the inner side of the supporting bar 76.

On the other side of the supporting bar 76, lands 112 extend lengthwise, parallel with one another, along the concave surface of the bar 76. The lands 112 serve as guide ways for the fingers which were designated collectively as 14. In this embodiment there are eight fingers, fingers 113 and 113' moving together as a pair, 114 and 114' moving together as a pair, 115 and 115' moving together as a pair, and 116 and 116', also moving together as a pair. Each of the fingers has, along both edges, narrow guide fins 117, which closely, but slidably engage the edges of the lands 112.

As can be seen particularly in FIGURE 11, in their winding position, the fingers are staggered with respect to one another, the fingers 116 and 116' extending to the block retainer plate 86, the fingers 115 and 115' extending to and slightly beyond the offset 77, the fingers 114 and 114' extending to and slightly beyond the offset 78, and the fingers 113 and 113' extending to and slightly beyond the offset 79. The blades extend into the floating core housing 60. In their winding position, their inner ends terminate in the same transverse plane. Near their inner ends, transversely across their finned side, the fingers are cut away to provide back stops 118, and forward stops 119, 120, 121 and 122 for the fingers 113 and 113', 114 and 114', 115 and 115', and 116 and 116', respectively. As shown in FIGURES 2 and 14, the forward stops 119, 120, 121 and 122 are progressively farther from the back stops 118, which, as will be discussed hereafter provides a lost-motion connection between the finger driving mechanism and the fingers 114 and 114', 115 and 115' and 116 and 116'.

Closely but slidably mounted between the inside of the floating core housing 60 and the fingers 14, is the stripper 15. The stripper 15 has longitudinal channels 134 extending substantially through its length. The channels 134 are dome shaped in section, complementary to the outer surface of the fingers 14, which provide, between successive channels, teeth 123 projecting between successive fingers. On the surface opposite the channeled surface, the stripper is provided with a latch-receiving well 125, close to the outer end of the stripper. At its inner end, the stripper has a smooth-shanked stripper stud 127, with a head 128, projecting longitudinally toward the push rod section end of the core 60.

The coil form blocks, wire push plate, fingers, and stripper all move relative to one another. The coordinating and driving device within the core by which this is accomplished, is a drive coupling 130 (see FIGURES 2, 13 and 16). The drive coupling 130 is a hollow piston with a heavy head 131, a skirt 132, and, at the free end of the skirt, a heavy, outwardly extending, eccentric flange 133. The flange 133 is bored and counterbored at diametrically opposite sides slidably to receive the head 110 and smooth shank of the actuator bar stud 109 at one side and the head 128 and smooth shank of the stripper stud 127 at the other. Between the skirt 132 and the actuator bar stud shank-receiving hole in the flange 133, the flange is cut out arcuately in the opposite direction of curvature from the skirt in that area, to form a finger-clearing passage 134.

The drive coupling 130 has a key, not here shown, which, sliding in a keyway 61 running longitudinally in the inner wall of the floating core 60, prevents rotation of the drive coupling.

The head 131 carries an arcuate blade retainer and driver 135. The blade retainer and driver 135 has a lip 136 along its leading edge. The lip 136 fits within the cut away part of the fingers between the back stops 118 and the forward stops 119, 120, 121 and 122. The arc of the blade retainer and driver 160 is the same as that of the concave face of the supporting bar 76 and the faces of the lip and the supporting bar are aligned, so as to maintain the fingers in parallel alignment within the core 75.

The drive coupling 130 also carries a push rod catch and release mechanism 140 (see FIGURES 2 and 13). The push rod catch and release mechanism 140 is, in the embodiment shown, commercially available, and consists of a collet body 141, with a socket 142 opening toward the push rod 13. Retaining balls 143 are loosely confined in radially extending seats 144, which permit a part of the ball to project into the socket 142. A sleeve 145, is biased in the direction of the opening of the socket 142, by a spring 146. The sleeve 145 is offset internally so that in one position of the sleeve, the balls are free to move outwardly in their seats (FIGURE 2), while in another position of the sleeve, the balls are held in a position to project into the socket 142 (FIGURE 13). The sleeve 145 is moved to its former (release) position when it engages the inside wall of a core cap 150. The core cap 150 has an opening 151 large enough to admit the push rod 13 but smaller than the outside diameter of the sleeve 145, and openings 152 to permit the installing or adjusting of the studs 109 and 127.

The core 60, then, variously supports and houses the coil forms and coil carrying and stripping means. The barrel 31 is adapted to rotate the wire gun about the core-supported coil forms, and the head section 1 carries both.

In addition to the core and barrel mechanisms, the head section 1 also houses a feed and jump mechanism 160. The function of the feed and jump mechanism 160 is to control the lay of the conductor around the core forms 75.

Near the longitudinally inner end of the sliding tube 43 in the wire gun 40, a bracket 45 is secured to and around the sliding tube. A part of the bracket extends within the slot in the barrel 31. The bracket 45 has a pair of wings 46 extending radially from the sliding tube 43, and carrying rollers 47, which are mounted for rotation on shafts the axes of which are parallel with the axis of the tube 43. In the center of the bracket 45, between the rollers 47, a roller 48 is mounted for rotation on a shaft 49 which is at right angles to the axis of the tube 43. The rollers 47 and 48 are confined within the inwardly opening channel 162 of a guide ring 161. The rollers 47 bear on the web defining the bottom of the channel 162. The roller 48 bears upon the inside surface of one or the other of the side walls defining the channel 162.

In this embodiment of machine, each set of three coils is wound progressively from the outer (stator section) end of the coil form toward the inner (push rod section) end but successive sets of coils are wound in opposite directions of rotation. The coils are wound on the forms in a single layer uniformly through each coil of the set. In order to accomplish this, the feed and jump mechanism, is arranged to move the head of the wire gun to the outer end of the coil form, to move the wire gun head uniformly, longitudinally, while it is rotating about the coil form, through the length of each coil form block, and to jump the gun head from one block to the next, to avoid wedging of the wire at the offset between the successively larger coil form blocks. It can be seen, that the longitudinal movement of the head of the wire gun is controlled by the movement of the sliding tube 43, which, in turn, is controlled, through the bracket 45, by the movement of the guide ring 161. The mechanism by which the guide ring 161 is moved will next be described.

The guide ring 161 is fixedly mounted on a guide ring carriage 165 which is perpendicular thereto. The guide ring carriage 165 has, mounted symmetrically on either side of it, two reset and bias cylinders 166 and 166'. The reset and bias cylinders 166 and 166' in this embodiment, are air cylinders. Air connections on either end of each cylinder, which may be through carriage rods 169 and 169', are not here shown. Centered on the carriage 165 between the cylinders 166 and 166', and, like the cylinders, oriented parallel with the axis of the wire gun 40, is a jump pawl rack 167, with two sets of teeth 168 and 168'. The cylinders 166 and 166' are movably mounted on the carriage rods 169 and 169', respectively, which, in turn, are fixedly mounted at their ends in the end walls 24 and 24' of the housing 21. The carriage rods 169 and 169' are also piston rods, but are fixed against movement, so that the cylinders 166 and 166' move on the rods 169 and 169' in response to the admission of compressed air to one end or the other of the cylinders. Since the cylinders, guide ring carriage and guide ring 161 are all rigidly connected, the movement of the cylinders carries the sliding tube 43 back and forth from one end of the coil form to the other. The remainder of the feed jump mechanism assembly is arranged to govern that movement.

Rod and screw supports 175 and 175' are fastened within the housing 21 parallel with the end walls 24 and 24' respectively. Parallel pawl carriage supporting rods 176 and 176' are fixedly mounted at their ends in the supports 175 and 175'. Slidably mounted on the pawl carriage supporting rods 176 and 176', is a pawl carriage 177. The pawl carriage 177 includes a platform 178, having integral with it, at its four corners, sleeves 179, embracing the rods 176 and 176'. Bolted to the inner side of the platform 178, but with a loading spring capsule 181 extending through the platform, are two longitudinally aligned, spring loaded jump pawls 180 and 180', pivotally supported in their respective mountings on pins 182 extending at right angles to the axis of the wire gun tubes. The spring loaded ends of the jump pawls 180 and 180' are positioned alternately to engage teeth 168 and 168' of the jump pawl rack 167 on the guide ring carriage 165.

On the outside of the platform 178, in the center transversely of the platform, two, longitudinally aligned, spaced jump pawl solenoids 183 and 183' are fixedly mounted. Each of the jump pawl solenoids 183 and 183' has a plunger 184, extending through a hole in the platform, in a position to engage the end of the pawl on the other side of the pivot pin 182 from the loading capsule 181, i.e. in a position to rock the pawl, against the bias of the spring in the capsule 181, away from the teeth 168 and 168'.

An L-shaped reset latch 185 is secured to the stator stand end of the platform 178, with the foot of the L extending in front of the stator stand end of the jump pawl rack 167.

Mounted on the opposite longitudinal edges of the pawl carriage 177 are lead nut pawl supports 190 and 190'. Each of the lead nut pawl supports 190 and 190' carries a lead nut pawl 191 and 191' respectively, pivotally mounted on a pin 192 the axis of which is at right angles to the axis of the wire gun tubes, and at right angles to the pivot pin of the jump pawls 180 and 180'. The lead nut pawls 191 and 191' are spring loaded on one side of their respective pivot pins 192, and are adapted to be engaged on the other side of the pivot pins 192 by a plunger of lead nut pawl solenoids 194 and 194' respectively, mounted on the lead nut pawl supports 190 and 190'.

Two lead screws, 196 and 196' are rotatably journaled at their ends in rod and screw supports 175 and 175'. The lead screws 196 and 196' extend by and inboard of the lead nut pawl solenoids 194 and 194', parallel with one another, and are spaced from the outer sides of the platform 178. The lead screws 196 and 196' are identical. A lead nut 200 is threaded on the lead screw 196, while a lead nut 200' is threaded on the lead screw 196'. The lead nut 200 has a step shoulder 201 on it, which, when properly positioned longitudinally of the lead screw 196 with respect to the lead nut pawl 191, is engaged by the spring loaded end of the lead nut pawl 191. Similarly, the lead nut 200' has a stepped shoulder 201', which, when the lead nut 200' is positioned properly longitudinally of the lead screw 196' with respect to the lead nut pawl 191', is adapted to be engaged by the spring loaded end of the lead nut pawl 191'. Each of the lead nuts 200 and 200', is provided with a channel 202, which slidably receives a fixed nut guide 203 which is fixedly mounted in the housing 21. The nut guides 203 serve to prevent rotation of the nuts 200 and 200'.

As can be seen particularly from FIGURE 3, the lead nuts 200 and 200' travel toward opposite ends of the lead screws 196 and 196'. This is accomplished by rotating the lead screws 196 and 196' in opposite directions, which in turn, results from the provision of lead screw drive gears 205 and 205', keyed to one end of the lead screws 196 and 196' respectively, and intermeshing with one another. The gear 205 is driven, through a gear train 210, by a drive gear 211, which also drives, directly, a ring gear 30 keyed to the barrel 31. It can be seen, that by changing the gears in the gear train between the drive gear 211 and the lead screw gear 205, various ratios of rotation of the lead screws to the rotation of the barrel 31 can be easily achieved. The drive gear 211 is in turn driven, either directly or mediately, by the hydraulic motor 10.

It can be seen that since the winding of the coils on the coil forms is accomplished by the rotation of the wire gun, and particularly the wire gun head, about the coil forms, and since it will be seen in connection with the crossover wire holding assembly, that the position of the wire gun head circumferentially of the forms, when the winding of one set of coils has been completed, is of great importance, it is necessary to provide means for holding the core 60 against rotation relative to te barrel 31, and it it necessary to provide sensing means for locating the wire gun circumferentially on its last pass about the coil form in the winding of each coil set. In order to hold the core 60 against rotation, and at the same time to permit the rotation of the barrel and its projecting wire gun tail piece 41 through 360°, an outwardly flanged collar 63, with two, oppositely disposed, radially outwardly opening notches 64 in the flange, is secured to the push rod section end of the core 60. A pair of shot pins 66 and 66' are slidably mounted in housings 65 and 65' on the outside face of the end wall 24 of the housing 21. The shot pins 66 and 66' are moved alternately in and out of the notches 64 by the action of an eccentrically positioned cam track 51 on the cam track plate 52, bearing on rollers 67, mounted on the shot pins, as indicated particularly in FIGURE 4. Also mounted on the end plate 24, are wire gun locating switch assemblies 68 and 68'. The wire gun locating switch assemblies includes switches 69 and 69', with feelers 70 and 70' respectively projecting toward the cam track plate 52, rockers 71 and 71', on one end of which the switches 69 and 69' respectively are mounted, and control rods 72 and 72' pivotally mounted on the other end of the rockers 71 and 71'. The rockers 71 and 71' are pivotally mounted on studs 73 and 73', respectively, taking into the end wall 24.

As can be seen in FIGURE 1, the wire feed mechanism 4 consists of the usual wire spool bin 37, from which the wire 12 leads over the sheaves of a standard wire tensioning assembly 38, to a wire guide 39, thence to the tail piece 41 of the wire gun. The wire guide 39 is positioned eccentrically with respect to the axis of rotation of the barrel, just far enough to clear the push rod 13 when the push rod 13 is extended.

The push rod 13 is the moving element in the push rod section 2, which also includes a frame 220, a double acting push rod cylinder 221 mounted on the frame, and fluid pressure and exhaust connections, not here shown, to the two ends of the cylinder. The cylinder and push rod are aligned with the socket 142 of the drive coupling 130 in the core 60. At the end of the push rod, which is a piston rod actuated by the fluid cylinder 221, is a knob 222 defined in part by a neck 223 on the cylinder side of the knob. The knob is proportioned to fit closely, radially, but slidably within the socket 142, and, when fully seated, to extend inwardly beyond the balls 143 in the catch and release body 141. The neck 223 is of sufficiently reduced diameter, and is so positioned, as to permit the balls 143 to move to their fully seated position, radially inward of the knob 222, when the knob is in its fully seated portion.

At the opposite end of the machine from the push rod section, is the stator section 3. The stator section 3 contains rotating means for holding and indexing a stator, and stripper pulling means for pulling the stripper, and the pre-formed coils, through the stator. Both means are supported in a stator section housing 230.

The stator section housing 230 includes a base plate 231, a front end wall 232, a rear end wall 233, and a bearing partition 234 parallel with the front and rear end walls 232 and 233, intermediate the front and rear end walls. The front end wall 232 and the bearing partition 234 are provided with axially aligned openings 235 and 236 respectively. A supporting journal 237 is welded in place around the opening 235 and within the opening 236. Bushings 240 are fit into the journal 237, and a stator nest support consists of a cylindrical hollow body 243, a face plate 244, and a cradle 245 integral with and projecting from the face plate toward the head section. The face plate 244, bearing against the outer radial face of a bushing 240, prevents axial movement of the stator nest support in a direction away from the head section. A locator plate 246, carrying an index gear 247, bolted to the radial face of the body 243, and bearing on the outer radial face of the other bushing 240, serves to prevent axial shifting of the stator nest support in the other direction.

In the illustrative embodiment shown, in which a four-pole motor is being wound, the locator plate 246 is provided with four V-shaped locator notches 250, 90° apart, around its periphery. A shot pin 251, the end of which is shaped complementarily to the locator notches 250, is positioned to be moved into and out of the locator notches 250. The shot pin 251 extends through a slot in guide 252 mounted on a face of the bearing partition 234, and is moved into and out of a properly positioned locator notch by means of a shot pin cylinder 253, mounted on the base 231. The shot pin cylinder 253 has suitable fluid connections, not here shown.

The index gear 247, on the locator plate 246, is driven by an index drive gear 248 which is coupled to a pinion 249, driven by a rack 254. The rack 254 is extended and retracted by a rack cylinder 255, mounted in the base 231. A rack support 256, bearing on the edge of the rack 254 opposite the teeth on the rack, serves to keep the rack in engagement with the pinion 249. A rack limit switch 260 is mounted in the housing 230 in a position to be engaged by the end of the rack toward its outer limit of travel from the cylinder 255.

A stator nest assembly 265, includes a stator nest 266 supported by and within the compass of the cradle 245, a stator locating lug 270, a clamp lug 271 and a stator side rail 272. The stator nest 266 is made up of a fixed semicircular segment 273, and a hinged semicircular segment 267, hinged at one end to one end of the fixed segment 273 and provided at its free end with a stator latch 268, with a handle 269. The stator latch 268 cooperates with a latch receiver 274 on the corresponding end of the fixed segment 273. The stator nest is arranged to hold a stator to be wound in a position to receive the fingers 14 closely along the ends of the radially inwardly extending, slot-defining teeth of the stator, as indicated in FIGURE 10.

Mounted in the inside of the stator nest support body 243, is a sleeve bearing 275, in which a stripper pull rod 276 is journaled for reciprocation.

The stripper pull rod is hollow, and is slotted diametrically at its head section end. Within the slot, a stripper latch lever 278 is pivotally mounted on a pin 277. The stripper latch lever 278 has, at its head section end, a latch hook 280, and, on the other side of the pivot pin 279, a bifurcation 281, within which a lever actuator pin 282 extends. The lever actuator pin 282 is carried by a lever actuator rod clevis 283, mounted on the end of a lever actuator rod 285. The lever actuator rod is moved, by fluid pressure, in and out of a latch lever cylinder 286, mounted within the stripper pull rod. A passage 277 in the stripper pull rod, communicates at one end with the latch lever cylinder 286, and at its other end, with fluid passages 287 and 288 extending radially through the stripper pull rod, for connection to a source of fluid pressure and exhaust, not here shown.

On the outside of the stripper pull rod, at the latch end of the rod, is a finger alignment tool 290, which is identical in configuration along its radially outward face, and is exactly aligned with, the toothed face of the stripper 15. At the other end of the stripper pull rod, a guide pin 294 is mounted in the pull rod, and projects radially therefrom into a keyway 295 in a pull rod guide bracket 296, to permit the stripper pull rod to move axially, but restrain it against rotation. The stripper pull rod 276 is moved axially by a piston rod 297, the end of which is mounted in a socket 298 in the end of the stripper pull rod opposite the latch 278. The piston rod 297 is driven by a double acting fluid cylinder 299, to which suitable fluid connections, not here shown, are made to a source of fluid pressure and exhaust, not here shown.

Located between the outer end of the coil forms 75 and the stator nest assembly 265, is the crossover wire mechanism 5.

The crossover wire holding mechanism 5 is made up of a post 305, bolted to the top of the stand 6, a fluid pin cylinder 306, which may be integral with the post, or separately formed and mounted in the post, a disappearing pin 307, with a piston head 308 within the cylinder 306, and a wire engaging part 309 which is moved alternately to retract into and project from the post 305, and fluid conduits 310 and 311 to the cylinder 306, adapted to receive fittings on fluid lines from a suitable source of fluid pressure, not here shown.

In operation, a stator core is mounted in the stator nest, by swinging the hinged section 267 of the stator nest back, positioning the stator with a locating notch 316 on the locator 270, and closing the hinged section of the stator nest until the stator latch 268 locks. The conductor wire 12 has been led from its spool, around the sheaves of the wire tension device, through the wire guide 39, through the elements 41, 42 and 43 of the wire gun 40, and out the wire gun head 44. In the position in which winding is started, the wire gun head 44 is close to the outer end of the coil form 75. The guide ring carriage 165 and the pawl carriage 177 are at the stator end of the housing 21, the lead nut pawl 191 is in engagement with the shoulder 201 on the lead nut 200, and the jump pawl 180 is in engagement with the tooth 168 of the jump pawl rack 165 nearest the ring 161. The push rod 13 is in its retracted position, disconnected from the drive coupling 130, which is at the push rod end of the core housing 60. In this position, the drive coupling 130 holds the stripper in its retracted position, the fingers 14 in their unextended position, and the coil form blocks 80, 81, and 82 in their fully expanded condition, by the bearing of the stop 105 against the restoring lug 100, rocking the collapse bell crank lever 96 to force the block holders 83, 84 and 85 to their outermost positions.

Fluid is admitted to the latch end of the stripper pull rod cylinder 299 and the latch lever cylinder 286, so that the stripper pull rod 276 is retracted, and the latch lever 278 is raised into the confines of the stripper pull rod. Fluid is admitted to the stator stand end of the disappearing pin cylinder 306, so as to cause the disappearing pin to project from the post 305, and fluid is admitted to the stator stand end of reset and bias cylinders 166 and 166', biasing the cylinders, hence the guide ring carriage 165 and lead nut pawl 191, against the lead nut shoulder 201.

The free end of the wire 12 is now given a turn around the wire engaging part of the disappearing pin 307, temporarily to hold it, and the hydraulic motor 10 is energized to drive the barrel gear 30 and the lead screw gears 205 and 205'. By way of illustration, the barrel gear will be driven first in a counterclockwise direction, as viewed in the direction of the stator core.

As the barrel 31 revolves, the core holding shot pins 66 and 66' are moved by the cam track 51, to clear the tail piece 41 as it passes the retracted shot pin. Also, as the barrel 31 revolves, the lead screws 196 and 196', revolving in opposite directions, cause the lead nuts 200 and 200', which are restrained against rotation, to travel in opposite directions, the lead nut 200 moving at a uniform rate toward the push rod end of the housing 21, and the lead nut 201' moving toward the stator stand end. Since the cylinders 166 and 166' are biased by the pressure of fluid in them, against the lead nut 200, they will move with the lead nut toward the push rod end of the housing. The movement of the cylinders 166 and 166' will cause the guide ring 161 to move, carrying with it the roller 48, hence the sliding tube 43 and the head 44. During this movement, the solenoid 194' is continuously energized, to hold the lead nut pawl 191' clear of the lead nut 200' as the two pass one another.

A counter, not here shown, acts, when a predetermined number of turns have been made about the outer block 82 and fingers 116 and 116', to energize the jump pawl solenoid 183, raising the pawl 180, and permitting the bias of the cylinders 166 and 166' to jump the guide ring carriage 165, hence the wire gun head 44, to the position at which the jump pawl 180' engages the first jump rack tooth 168'. This positions the wire gun head 44 in a position to make the next turn around the block 81 and fingers 115 and 115', without jamming or tangling the wire between the last turn about the outermost block and the offset 78 or the ends of the fingers 115 and 115'.

Figure 20:
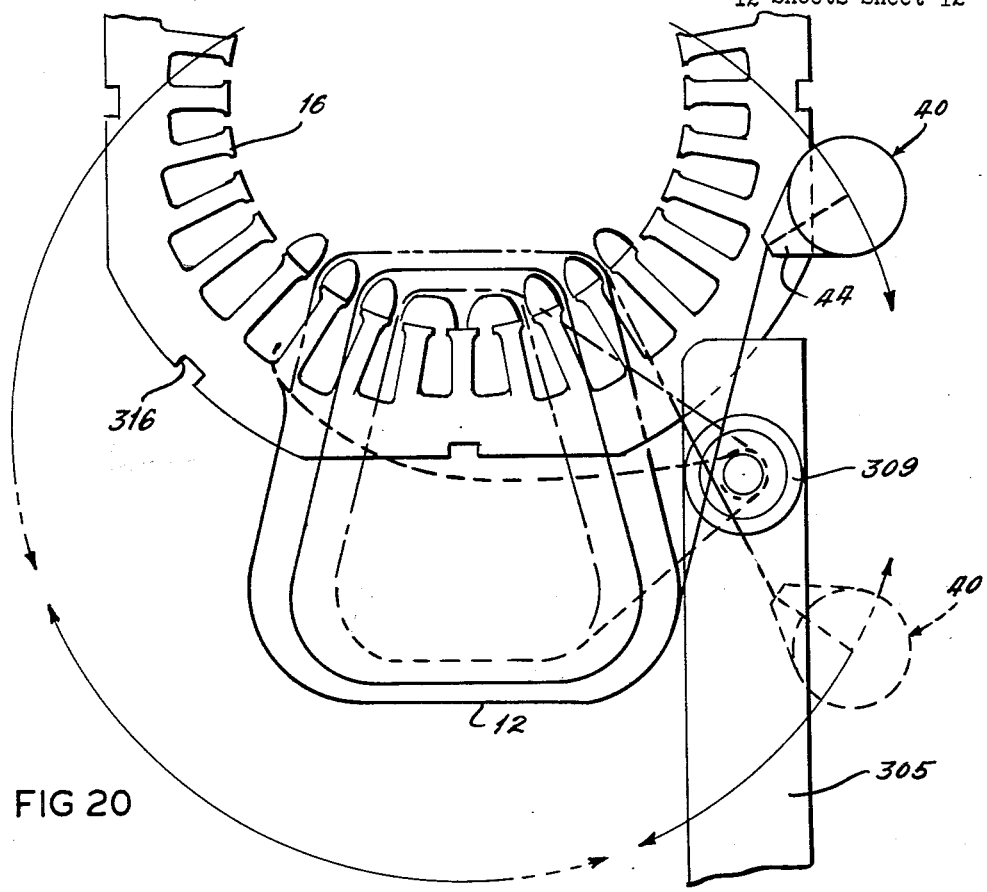
FIGURE 20 is a diagrammatic view showing the path of the conductor as it is formed into successive coils.

When the predetermined number of turns have been made on the coil form block 81 and fingers 115 and 115', the counter acts to energize the jump pawl solenoid 183', lifting the engaged end of the jump pawl 180', and permitted the bias of the cylinders 166 and 166' to jump the carriage in the direction of the push rod section, until the jump pawl 180 engages the second tooth 168 of the jump pawl rack 167. This jumps the wire gun head 44 to a position at which it winds the wire 12 about the block 80 and fingers 114 and 114', without jamming or tangling the wire between the last pass of wire on the block 81 and fingers 115 and 115' and the offset 79, or the fingers 114 and 114'. After a predetermined number of turns have been made by the wire gun about the block 80 and fingers 114 and 114', the counter acts to slow the hydraulic motor 10, and to move the wire gun locating switch 69' and feeler 70' into position to engage a cam 55 on the cam track plate 52. The resultant signal from the switch 69' actuates a brake, not here shown, in such a way as invariably to stop the wire gun in the position shown in FIGURE 20 in solid line, when the gun has been rotating in a counterclockwise direction.

Fluid is now admitted to the head section end of the disappearing pin cylinder 306, and the disappearing pin is retracted, freeing the end of the wire 12. Fluid is admitted to the end of the push rod cylinder 221 opposite the head section, moving the push rod 13 forward, seating the knob 222 in the socket 142, and driving the drive coupling 130 toward the stator stand. As the drive coupling 130 moves toward the stator stand, the sleeve 145, biased by the spring 146, moves relative to the collet body 141, camming the balls 143 into place behind the knob 222, as shown in FIGURE 13. The blade retainer and driver 135 is in immediate engagement with the forward stop 119 and moves the fingers 113 and 113' with it. The fingers 113 and 113' move out alongside the fingers 114 and 114', with opposite reaches of the coiled wire on the fingers 114 and 114' between them. The stripper 15 and the collapse bell crank lever actuator 104 have, during this time, like the remaining fingers, remained unmoved, as shown in FIGURE 14. When the fingers 113 and 113' have reached the position at which they are co-terminal longitudinally with the fingers 114 and 114', the leading edge of the blade retainer and driver 135 engages the shoulder 120 of the fingers 114 and 114', while the flange 133 engages the end faces of the actuator bar 104 and stripper 15 respectively, moving the fingers 113 and 113' (which are already engaged), the fingers 114 and 114', actuator bar 104, and stripper 15 simultaneously toward the stator stand. As the actuator bar 104 moves toward the stator stand, the bell crank lever restoring lever lug 100 is freed by the movement of the stop 105 away from it, while at the same time, the first step 106 of the actuator bar engages the rollers 95, rocking the bell crank lever 96 about the lever pins 97, and moving the link 95, and the inner block holder 83, to which it is connected, toward the push rod end of the core, collapsing the block 80, and moving the head of the linking stud 91 toward the wall 93, though not into contact therewith. The teeth 123 of the stripper, which extend between the fingers 113 and 114 and 113' and 114', are not called upon at this time to serve any stripping function, because the movement of the fingers 114 and 114', aided by the wire push plate 103, which moves with the actuator bar, through the channel 94, will carry with those fingers the wire which is wound upon them, along and beyond the collapsed block 80.

As the fingers 113 and 113', and 114 and 114', reach the position at which they are co-terminal longitudinally with the fingers 115 and 115', the second step 107 of the actuator bar 104 reaches the rollers 98 on the bell crank lever 96, rocking the bell crank lever far enough so that the head of the link stud 91, bearing upon the wall 93, pulls the block holder 84 in the direction of the push rod section, collapsing the block 81. The movement of the block holder 84 away from the stator, causes the head of the link stud 90 to move toward the wall 92, but not into contact therewith (FIG. 15).

Figure 18:
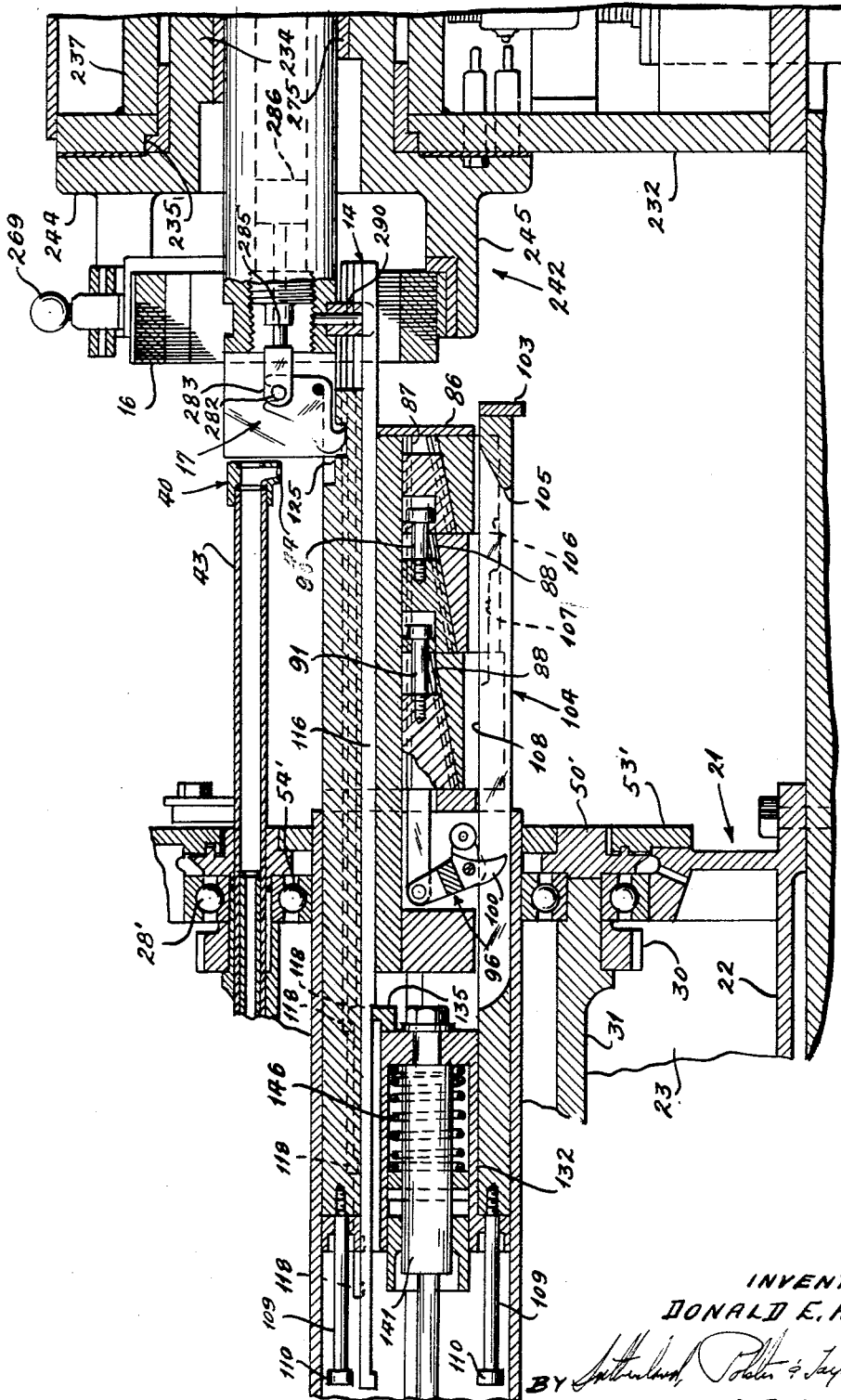
FIGURE 18 is a fragmentary sectional view of the stator section and of the core of the head section, showing the stripper and stripper pulling mechanism in engagement.

As the fingers 113 and 113', 114 and 114', and 115 and 115', approach the position at which they are co-terminal, longitudinally, with the ends of the fingers 116 and 116', the rollers 98 on the bell crank lever 96 are engaged by the riser step 108 of the actuator bar 104, causing the head of the link stud 90 to bear against the wall 92 and the block holder 85 to be moved away from the stator, collapsing the block 82. The leading edges of all three of the coils making up the coil set, are now substantially aligned. All of the fingers 14 now move simultaneously beyond the end of the coil form, removing the coils beyond the block 82 and the retainer plate 86. The leading edges of the coils now meet the radial face of the stator core 16, and the fingers continue their travel, extending through the bore of the stator. The coils are prevented from following the fingers, by their abutment against the radial face of the stator. The stripper, which lags the fingers through their entire travel, moves up only to the vicinity of the radial face of the stator, and does not, at this point, enter the bore (FIGURES 16 and 18).

Simultaneously with the movement of the stripper and fingers toward the stator, the wire gun 40 is moved to its starting position at the stator end of the coil form. This is accomplished by exhausting the fluid from the stator end of the reset and bias cylinders 166 and 166', and admitting fluid to the push rod end of those cylinders. The cylinders, hence the guide ring carriage 165 and jump pawl rack 167 move to the right, as viewed in FIGURES 2 and 3. The jump pawl rack 167 moves under jump pawls 180 and 180', until its end engages reset latch 185, when the cylinders and carriage 165 carry the pawl carriage 177 with them to the stator end of the housing 21. In this way, there is little relative movement between the head of the wire gun and the last reach of the last wound coil, prior to its insertion in the slots of the stator to be wound. In the reset position of the pawl carriage 177, the lead nut pawl 201' is in a position to engage the lead nut 200', on the next cycle.

Fluid is now admitted to the outer end of the pull rod cylinder 299, moving the piston rod 297 and stripper pull rod 276, along with the latch lever 278 and finger alignment tool 290. The latch lever 278 is moved through the stator bore and beyond the bore to a position at which its hook 280 is above the well 125 in the stripper. As the finger alignment tool 290 moves toward the stripper, it engages and slides along the fingers 14 in the same manner as the stripper, aligning the fingers and holding them against lateral displacement with respect to one another.

Fluid is now admitted to the outer end of the latch lever cylinder 286, moving the lever actuator rod to the left as viewed in FIGURE 17, rocking the latch lever hook into the stripper well 125. While pressure is maintained in the latch lever cylinder 286 to keep the hook in the well, fluid is admitted to the inner (stator) end of the pull rod cylinder 299, and exhausted from the other end, causing the piston rod 297, the stripper pull rod 276, and the latch lever 278 to move back through the stator bore, pulling the stripper 15 through the bore, and pulling the coils through the stator slots between the fingers 14. It can be seen that the stripper assumes the aligning and steadying function of the finger alignment tool 290, as the stripper moves toward the ends of the fingers and the finger alignment tool moves off the ends of the fingers. The leading edge of the stripper 15 actually moves slightly beyond the ends of the fingers 14, so as to move the coil ends over the ends of the fingers.

Fluid is now exhausted from the latch lever cylinder 286, moving the lever actuator 285 to the right as viewed in FIGURE 17, rocking the latch lever hook out of the well 125. Fluid is now admitted to the head section end of the push rod cylinder 221, moving the push rod 13 away from the stator, carrying with it the drive coupling 130. The drive coupling 130 carries with it the stripper 15 and the fingers 14 which are restored to their winding position. When the sleeve 145 around the catch and release mechanism 140 strikes the core cap 150, the body 141 moves toward the push rod section relative to the sleeve 145, releasing the balls 143, and permitting the knob 222 of the push rod to be released from the socket 142, and to continue to its most retracted position, where it is clear of the wire 12.

Figure 19:
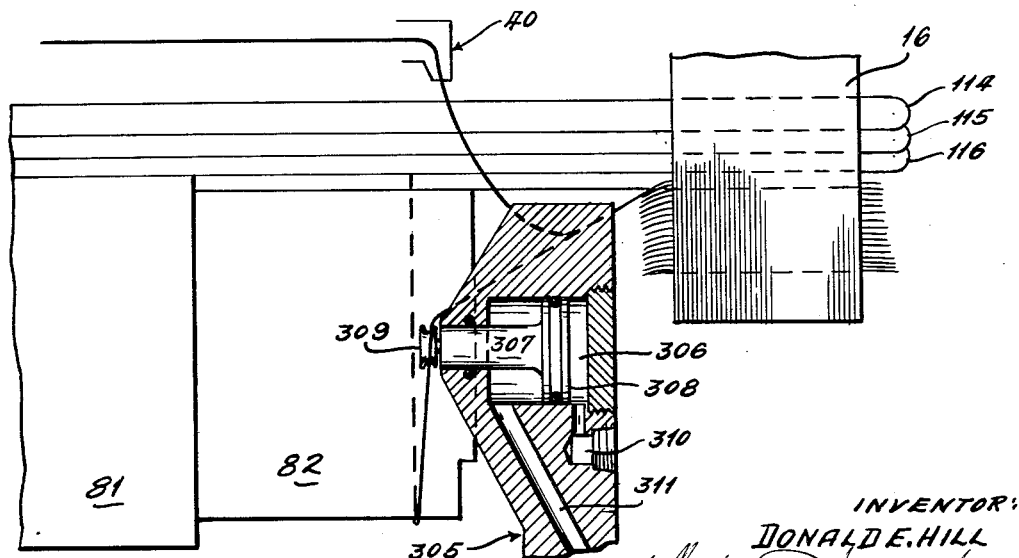
FIGURE 19 is a fragmentary sectional view of the crossover wire holding mechanism and a somewhat diagrammatic representation of the coil form, wire feed gun and partly wound stator.

The coils just inserted were wound in a counterclockwise direction as viewed toward the stator from the head. The stop position of the wire gun, which remains in the same circumferential position during its travel toward the stator during the reset process, is shown in solid lines in FIGURE 20. Fluid is now admitted to the stator end of the pin cylinder 306, moving the disappearing pin 307 to project from the post 305. The hydraulic motor 10 is now run in the opposite direction of rotation from that of the first cycle, driving the drum and wire gun in a clockwise position as viewed in a direction toward the stator. Fluid having again been admitted to the stator stand end of the reset and bias cylinders 166 and 166', and the lead screws 196 and 196' turning in the opposite direction of rotation from the first cycle, the wire gun begins its axial travel along with its rotation about the form 75. However, on its first pass, the wire, which tends from the wire gun head to the inserted coil, is caught by the wire-engaging part 309 of the disappearing pin 307, as indicated in FIGURE 19. This has two results: first, it guides the wire smoothly from the inserted coil onto the outermost section of the coil form, and second, it meters an appropriate amount of crossover wire to the next set of coils. On the second revolution of the head of the wire gun, the axial travel of the wire gun is sufficient to cause the wire to clear the end of the disappearing pin. After the gun has made a few turns about the first coil form, the disappearing pin is retracted by admitting fluid to the head section end of the pin cylinder and exhausting the other end, freeing the crossover wire. The set of the wire is sufficient to prevent unwinding of the outermost coil. The stator locating shot pin 251 is now withdrawn from the notch 250 in which it has been seated, the stator index rack 254 is moved, by fluid admitted to the far end of index rack cylinder 255, to rotate the stator nest support through 90°, and the shot pin is moved into the next notch 250, thus positioning an unfilled set of stator slots to be loaded. The remainder of the winding and inserting cycle is the same as has been described for the first set of coils, except that as the wire gun nears the end of its travel toward the head, the counter causes the control rod 72 to move the locating switch 69 and feeler 70 into position to engage the cam 55 and stop the wire gun, after the clockwise rotation, in the position shown in dotted lines in FIGURE 20.

The winding of the third set of coils is the same as the winding of the first set of coils, except that, when the wire gun begins its counterclockwise rotation, the wire is looped about the wire-engaging part of the disappearing pin automatically.

The winding and insertion of the fourth set of coils is the same as the winding and insertion of the second set. After the insertion of the fourth set of coils, and the restoring of the stator to its original position, so that the stator clamp lever handle 269 is accessible, the machine shuts down. The wire 12 from the wire gun, is broken to provide the other lead, the wound stator is removed from the stator nest, an empty stator core is put into the nest, and the winding process is repeated.

In actual production, the machine is programmed to perform all of the winding and inserting steps, for all the sets of coils, automatically. The operator need only clamp the core into position in the stator nest, make a temporary loop of the wire around the disappearing pin, start the machine, and, when the winding and inserting are finished, break the wire 12 and remove the wound stator. Even these manual operations can be mechanized, but it may be uneconomic to do so, since an operator is ordinarily required in any event.

While they have not been shown, means are normally provided for insulating the walls defining the slots of the stator, from the coils. This insulation may take the form of conventional fiber slot insulation, a coating of insulating material, or any other suitable insulating means.

It will be noted that all of the parts have been described with respect to their axial or radial relationship rather than in terms of horizontal and vertical relationship. This is because the machine, being positively driven in each of its movements, can be oriented in any desired position, from horizontal to vertical.

Having thus described the invention, what is claimed and desired to be secured by Letters Patent is:

1. In a coil winding and inserting machine the improvement comprising a head, a barrel rotatably mounted in said head, a wire gun mounted on said barrel for rotation therewith, a floating core mounted within and extending axially of said barrel, means alternately engageable with and disengageable from said core for holding said core against rotation with said barrel, a coil form connected with said core at one end, axially movable finger means lying along said coil form, and push rod means extending axially for movement into and out of said barrel to move said finger means axially, said push rod means being positioned at the end of the barrel opposite said coil form, said wire gun and coil form being positioned so that a part of said wire gun rotates around said coil form.

2. A coil winding and inserting machine comprising a push rod section, a head section, a stator section, and wire feed mechanism between the push rod section and the head section, said sections during one part of each winding and inserting cycle being physically separated from one another, and during another part connected; said head section comprising a head, a barrel rotatably mounted in said head, a wire gun mounted on said barrel for rotation therewith, a floating core mounted within and extending axially of said barrel, means alternately engageable with and disengageable from said core for holding said core against rotation with said barrel, and a coil form connected with said core at one end, said wire gun and coil form being positioned so that a part of said wire gun rotates around said coil form, wire from said wire feed mechanism being fed to the wire gun at the end of said gun remote from said coil form, and stripping means within said core, movable axially to strip coils from said coil form, said push rod section comprising a push rod adapted to releasably engage means within said core for moving said stripper axially, and means for moving said push rod; and said stator section comprising a stator nest for holding a stator core to be wound, latch means, positioned to be moved through a stator core in said stator nest to engage the said stripper and pull it through the said core, and means for moving said latch means.

3. A coil winding and inserting machine comprising a head section and a stator section, said head section comprising a barrel rotatably mounted in said head section, a wire gun mounted on said barrel for rotation therewith, a floating core mounted within and extending axially of said barrel, means for holding said core against rotation with said barrel, a coil form connected with said core at one end, said wire gun and coil form being positioned so that a part of said wire gun rotates around said coil form, and a stripper mounted on said core for axial movement with respect thereto along said coil form; and said stator section comprising a stator nest and a latch adapted to move through said stator nest and to engage the stripper to pull said stripper through a stator in said stator nest.

4. The machine of claim 3 wherein the core in the head contains a series of fingers over which the coils are formed, and said stator section includes a finger guide connected to said latch and adapted to engage the said fingers when the latch first engages said stripper.

5. In apparatus for winding a stator core, the improvement comprising a coil form, fingers spaced laterally from one another and lying along said coil form, means for moving said fingers with respect to said coil form to a position at which free ends of said fingers project beyond said coil form, a stripper having teeth extending between said fingers, latch means movable between a position along said fingers and a position beyond the free ends of said fingers, said latch means being arranged to engage said stripper, and a guide tool movable with said latch means, said guide tool having teeth extending between said fingers and serving to guide said fingers when said fingers are in the position at which they project beyond the coil form.

6. In apparatus for winding a stator core, the improvement comprising a coil form, fingers spaced laterally from one another and lying along said coil form, means for moving said fingers axially with respect to said coil form from a retracted to an extended position at which free ends of said fingers project axially beyond said coil form, and a guide tool movable between a position at which it is free of the fingers when the fingers are in their extended position and a position at which it engages the fingers.

7. In apparatus for winding a stator core, the improvement comprising a rotating barrel, a wire gun mounted to rotate with said barrel and having a part mounted for axial movement, a guide ring encircling said barrel, fixed against rotation with said barrel and mounted for axial movement with respect to said barrel, means for controllably moving said guide ring axially, comprising means for biasing said guide ring selectively in either axial direction with respect to said barrel, means connected with said guide ring for selectively engaging one of two lead nuts, each of said lead nuts being threadedly mounted on one of two lead screws arranged to drive said lead nuts in opposite axial directions of travel with respect to one another and means for rotating said lead screws, and means movably confined within said guide ring and connected to said axially movable part of said wire gun, for moving said part axially as said guide ring moves axially.

8. In apparatus for winding a stator core, the improvement comprising a coil form, fingers spaced laterally from one another and lying along said coil form, means for moving said fingers with respect to said coil form to an extended position at which free ends of said fingers project beyond said coil form, a stripper having teeth extending between said fingers, means for moving said stripper axially along said fingers, to an extended position, a guide tool mounted on a stand at a distance axially from the free ends of the fingers when the fingers are in their retracted position, and means for moving said guide tool to a position at which said guide tool engages the said fingers when said fingers are in their extended position and said stripper when said stripper is in its extended position.

9. The apparatus of claim 8 wherein the guide tool is provided with teeth corresponding with the teeth on the stripper, which guide tool teeth extend between said fingers.

10. Apparatus for winding and inserting stator coils comprising a collapsible coil form having on one surface a plurality of laterally spaced fingers lying along said coil form, and on a substantially oppositely disposed surface a channel, a stripper having teeth extending between said fingers, said stripper being movable longitudinally of said form and fingers, a push plate partly confined in said channel, and means for moving said stripper and said push plate simultaneously longitudinally of said form.

11. The apparatus of claim 10 wherein the push plate is mounted on an actuator bar, and the actuator bar carries means for collapsing the said coil form.

12. In a coil winding and inserting machine the improvement comprising a head, a barrel rotatably mounted in said head, a floating core mounted within and extending axially of said barrel, a wire gun mounted on said barrel for rotation therewith and extending axially of said barrel, means for maintaining the floating core against rotation, a coil form connected with said core at one end, means within said coil form for collapsing said coil form, said means including transversely movable coil form blocks, wedge-shaped block holders slidably keyed to said coil form blocks and to a supporting bar, whereby longitudinal movement of said holders effects transverse movement of said blocks, a bell crank lever mounted in said core and linked to said holders to move said holders when the bell crank lever is rocked, a bell crank lever actuator slidably mounted in said core and engaging said bell crank lever for rocking said bell crank lever as the said actuator is moved longitudinally of said core and coil form, and a push plate mounted on the outer end of said actuator and extending into a channel in the coil form blocks.

13. A coil winding and inserting machine having a head section, a barrel rotatably mounted in said head section, a wire gun mounted on said barrel, a floating core mounted within said barrel and carrying at one end a coil form about which a part of said wire gun rotates and along which said part moves axially, said part being slidably carried on said barrel, and means, for moving said wire gun part axially along said coil form, comprising a piece securely connected to said sliding wire gun part and projecting radially outwardly therefrom, a guide piece fixed against rotation relative to said wire gun and in sliding engagement with said wire gun part piece, said guide piece being mounted on a guide carriage slidably movable axially of said barrel and connected to means for selectively biasing said carriage in either axial direction, said guide carriage being releasably connected to a pawl carriage slidably mounted in said head section and adapted to be releasably connected to a lead screw, said guide carriage and pawl carriage being connected by pawl and teeth means positively engageable in only one direction of axial travel of the guide carriage, said pawl means being selectively disengageable and reengageable with said teeth means and one of said pawl and teeth means being mounted on one of the guide carriage and pawl carriage, and the other on the other.

14. In a coil winding and inserting machine wherein a wire gun rotates about and moves axially along a coil form supported at one end, to lay down successive loops axially along said coil forms, from the outer, free end of said coil form to the inner, supported end of said form, the improvement comprising a stator support spaced axially from the outer, free end of said coil form, for holding a stator to be wound, crossover wire holding means positioned between the end of the coil form and said stator support, said wire holding means comprising a post and a pin adapted to move from wire-engaging to wire clearing position, and means coordinated with the position of the wire gun for moving the said pin between wire engaging and wire clearing position.

References Cited in the file of this patent

UNITED STATES PATENTS

| | | |
|---|---|---|
| 1,807,199 | Dear | May 26, 1931 |
| 2,445,109 | Ferguson | July 13, 1948 |
| 2,711,008 | Smith | June 21, 1955 |
| 2,836,204 | Mason | May 27, 1958 |
| 2,861,601 | Marzolf | Nov. 25, 1958 |
| 2,873,515 | Winstrom | Feb. 17, 1959 |
| 2,934,099 | Mason | Apr. 26, 1960 |
| 2,952,069 | Young | Sept. 13, 1960 |
| 3,036,603 | Moore | May 29, 1962 |

FOREIGN PATENTS

| | | |
|---|---|---|
| 680,882 | Great Britain | Jan. 22, 1951 |